United States Patent
Kuhlmann

(10) Patent No.: US 8,727,272 B2
(45) Date of Patent: May 20, 2014

(54) APPARATUS FOR ADJUSTING A SURFACE OF AN AIRCRAFT MODEL, SURFACE UNIT, AIRCRAFT MODEL, AND USE OF AN AIRCRAFT MODEL

(75) Inventor: Thomas Kuhlmann, Breman (DE)

(73) Assignee: Airbus Operations GmbH, Hamburg (DE)

( * ) Notice: Subject to any disclaimer, the term of this patent is extended or adjusted under 35 U.S.C. 154(b) by 37 days.

(21) Appl. No.: 13/426,724

(22) Filed: Mar. 22, 2012

(65) Prior Publication Data

US 2012/0241556 A1 Sep. 27, 2012

Related U.S. Application Data

(60) Provisional application No. 61/466,821, filed on Mar. 23, 2011.

(30) Foreign Application Priority Data

Mar. 23, 2011 (DE) .......................... 10 2011 014 835

(51) Int. Cl.
*B64C 9/06* (2006.01)
*B64C 3/50* (2006.01)

(52) U.S. Cl.
USPC ........ 244/75.1; 244/99.2; 244/99.3; 244/212; 244/213; 244/215

(58) Field of Classification Search
USPC ................ 244/211, 212, 213, 214, 215, 99.3, 244/99.2, 99.4
See application file for complete search history.

(56) References Cited

U.S. PATENT DOCUMENTS 4,498,139 A * 2/1985 Malinovsky ................... 345/168
4,658,635 A 4/1987 Pszolla et al.
(Continued)

FOREIGN PATENT DOCUMENTS

DE 102008003543 A1 7/2009
DE 102007062736 B3 10/2009

OTHER PUBLICATIONS

German Patent Office, German Office Action for German Application No. 10 2011 014 835.3, dated Nov. 25, 2011.

(Continued)

*Primary Examiner* — Tien Dinh
*Assistant Examiner* — Michael Wang
(74) *Attorney, Agent, or Firm* — Ingrassia Fisher & Lorenz P.C.

(57) ABSTRACT

An apparatus for adjusting a surface of an aircraft model includes, but is not limited to a first linear adjustment unit with a first retaining body that is movable along a first axis, a second linear adjustment unit with a second retaining body that is movable along a second axis, and an angle adjustment unit. The second linear adjustment unit is arranged on the first retaining body, and the angle adjustment unit is arranged on the second retaining body and is configured to adjust and lock an angle between an attachment surface and a retaining surface. Consequently, precise positioning of surfaces of a wind-tunnel aircraft model does not require specially manufactured and individually adapted fittings for each setting position to be moved to.

20 Claims, 3 Drawing Sheets

(56) References Cited

U.S. PATENT DOCUMENTS

| | | | |
|---|---|---|---|
| 8,070,106 B2* | 12/2011 | Engelbrecht et al. | 244/215 |
| 8,104,710 B2* | 1/2012 | Harvey et al. | 244/99.2 |
| 2007/0034748 A1* | 2/2007 | Sakurai et al. | 244/215 |
| 2009/0146013 A1* | 6/2009 | Sheahan et al. | 244/213 |
| 2009/0166475 A1 | 7/2009 | Binder | |
| 2009/0179109 A1 | 7/2009 | Akkermann et al. | |
| 2009/0200420 A1* | 8/2009 | Harvey et al. | 244/99.3 |
| 2011/0139937 A1* | 6/2011 | Zeumer | 244/215 |

OTHER PUBLICATIONS

Goettinger, "Konstruktionssysteme für Optik und Feinmechanik", Spindler u Hoyer Katalog SH 201, 1979, pp. 24, 25, 29.

Goettinger, "Triangular Rails Build Up Materials Light Sources", Spindler u. Hoyer Katalog SH 234E, 1981, p. 99.

* cited by examiner

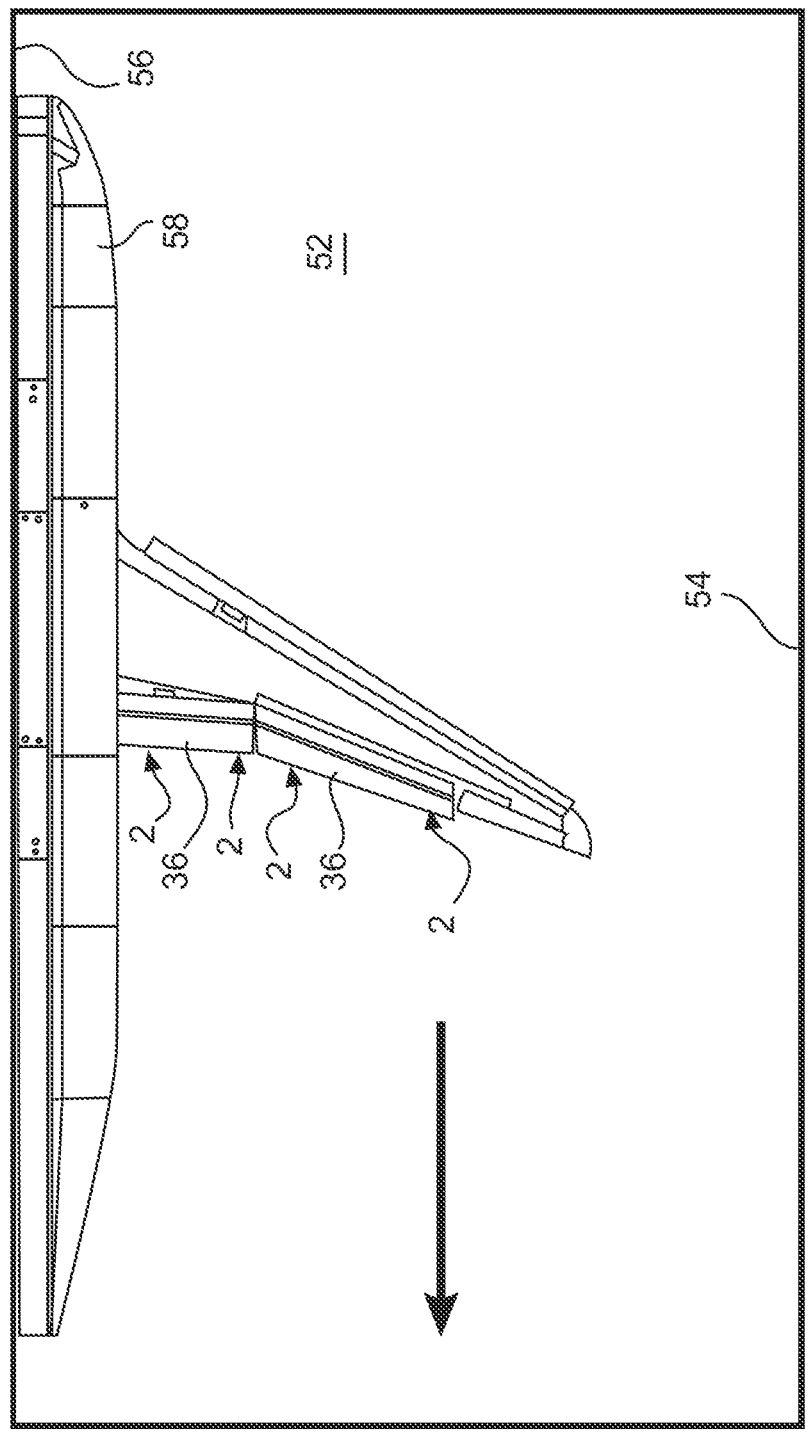

APPARATUS FOR ADJUSTING A SURFACE OF AN AIRCRAFT MODEL, SURFACE UNIT, AIRCRAFT MODEL, AND USE OF AN AIRCRAFT MODEL

CROSS-REFERENCE TO RELATED APPLICATIONS

This application claims priority to German Patent Application No. 10 2011 014 835.3, filed Mar. 23, 2011 and also claims priority to U.S. Provisional Patent Application No. 61/466,821, filed Mar. 23, 2011, which are incorporated herein by reference in entirety.

TECHNICAL FIELD

The technical field relates to an apparatus for adjusting a surface of an aircraft model, to a surface unit comprising at least one movable surface and at least one apparatus for adjusting a surface of an aircraft model, and also relates to an aircraft model comprising at least one surface and to at least one apparatus for adjusting the at least one surface, as well as to the use of an aircraft model in a wind tunnel for measuring or testing purposes.

BACKGROUND

In order to validate aerodynamic parameters, determined analytically and by means of fluid-mechanical simulation, for the design of an aircraft, tests are usually carried out in a wind tunnel. In this process a particular scale model of the aircraft to be tested is positioned in the wind tunnel where it is subjected to airflows. Depending on requirements, the model also comprises various movable surfaces, for example, control surfaces and high-lift slats and flaps, which can be moved to relevant setting positions. When testing a high-lift system that, for example, comprises a trailing-edge flap arrangement of an aircraft wing, during the measuring campaign usually a host of setting positions of different trailing-edge flaps are tested.

Normally, for the purpose of adjusting the setting positions of surfaces, individual fittings are specially constructed that are affixed to the corresponding model in order to on these fittings install the corresponding surface at the desired setting position. This means that after each instance of measuring at a particular setting position, the aircraft model needs to be modified so that, for example, consecutively, different fittings are used for the different setting positions. When testing trailing-edge flaps of an aircraft it is not only necessary to precisely adjust the angle of the trailing edges on the corresponding model, but also to set the gap between the trailing-edge flap and the trailing edge of the wing, as well as the overlap between the trailing edge of the wing and the trailing-edge flap.

Such a requirement, where at each setting position the model needs to be modified, is very time-consuming, in particular in the case of a multitude of setting positions to be implemented consecutively, because new fittings need to be manufactured for each setting position and for various surfaces, and after modification of the model the exact positions of the surface need to be measured and re-adjusted by fine-adjustment, shims or the like. In particular, in the testing of trailing-edge flaps this is especially cumbersome, because apart from the angle, as mentioned above, two further geometric parameters need to be measured and if necessary readjusted.

It is thus at least one object to propose an apparatus for adjusting various surfaces, in which the respective surface can be adapted as easily as possible to different positions, and in which readjustment is possible particularly easily without the use of shims or other means. It is at least another object that only a single type of fittings needs to be used in order to set different angles and other geometric positions of various surfaces. This applies in particular in the use of such an apparatus for adjusting a trailing-edge flap on a wind-tunnel aircraft model. In addition, other objects, desirable features and characteristics will become apparent from the subsequent summary and detailed description, and the appended claims, taken in conjunction with the accompanying drawings and this background.

SUMMARY

The apparatus according to an embodiment comprises a first linear adjustment unit with a first retaining body that is movable along a first axis, a second linear adjustment unit with a second retaining body that is movable along a second axis, and an angle adjustment unit. The second linear adjustment unit is arranged on the first retaining body. The angle adjustment unit is arranged on the second retaining body and is, furthermore, designed to adjust and lock an angle between an attachment surface and a retaining surface of the angle adjustment unit. Accordingly, the apparatus comprises two linear adjustment units and an angle adjustment unit, which units are mechanically interconnected in the form of a series connection.

In this context the term "linear adjustment unit" refers to a device that is in a position to exclusively carry out a linear movement. The means by which this movement is initiated is immaterial. In the present case the first and the second linear adjustment units each comprise a so-called retaining body, a term which in the context of this description refers to a body or object on which something can be retained or on which some other object or some other body can be arranged.

In this arrangement, the second linear adjustment unit is arranged on the first retaining body so that the entire second linear adjustment unit is moved when the first retaining body moves by adjusting the first linear adjustment unit. The same applies to the angle adjustment unit that is moved with the second retaining body if the aforesaid moves as a result of the second linear adjustment unit. The term "angle adjustment unit" refers to a device that by way of an attachment surface can be arranged on the second retaining body. An angle between this attachment surface and a retaining surface can be adjusted. It is the desirable to arrange a surface on the retaining surface of the angle adjustment unit, whose position depends on the three different adjustment units.

With the use of adjustment units, it is first of all not necessary to use individual fittings that are precisely manufactured for the desired setting positions. With the use of two linear adjustment units with a first axis and a second axis, as required, i.e., based on the type of the surface to be investigated, an apparatus can be created which can precisely take into account the setting positions which the surface is to assume. In this arrangement it is particularly desirable for the first axis and the second axis not to coincide, so that practically any positions and any angles can be set by the three different adjustment units.

In an embodiment, the first axis and the second axis extend so as to be perpendicular to each other so that starting from a structurally stable point of the aircraft model a movement in two different spatial directions can be carried out, which spatial directions are determined relative to the structurally stable point. A first axis could, for example, coincide with an x-axis of the model, while a second axis could coincide with a z-axis of the model. This is not mandatory, but could simplify measurability of the necessary adjustment paths.

In an embodiment, the first linear adjustment unit comprises an adjustment thread. This is a particularly simple embodiment of a linear adjustment unit and is based on the movement of a body comprising a thread along an adjustment thread in the form of a rotatable spindle or some other screw body. With the use of an adjustment thread it is particularly advantageous if the adjustment thread and the body moved by the adjustment thread and a body comprising a corresponding thread comprise play-free mating threads, which, while possibly increasing friction within the corresponding threads, nevertheless ensures particularly good setting accuracy. Play-free operation could be achieved by inserting a wire made of a flexible metal, for example copper, or with the use of a synthetic ring comprising nylon, polyethylene or the like into the mating threads. For the same reason the second linear adjustment unit could also comprise an adjustment thread.

In another embodiment, the first linear adjustment unit is designed as a slide guide that holds the retaining body so that it is movable in a linear manner along the first axis. The retaining body additionally comprises a threaded bore hole through that a rotatably held spindle extends. In this manner the function of the linear guide of the first retaining body is implemented fully independently of the function of adjustment so that in this manner at the same time very high positioning accuracy and adequate stability can be achieved. The slide could, for example, be implemented in the form of an elongated projection. The first retaining body comprises a corresponding section by means of which the first retaining body can slide along the elongated projection in the specified direction. The projection can also comprise an undercut that results in a type of dovetail guide results. However, variants comprising one or several rigid axes and corresponding boreholes in the first retaining body are also imaginable, as are an arrangement of a projection on the retaining body and an elongated indentation on the slide. In this context it should be pointed out that a multitude of projections and corresponding recesses can also be used.

In an embodiment, the second linear adjustment unit comprises a sleeve with an internal thread arranged therein, as well as a screw unit with a corresponding external thread. Preferably, either the sleeve or the screw unit is rotatably held. For example, the sleeve comprising the internal thread is rotatably held on the first retaining body so that said sleeve is firmly positioned but nevertheless rotatable relative to the first retaining body so that a screw unit contained therein can be screwed into the sleeve or out of the sleeve. As an alternative, it is also possible for the screw unit to be rotatably held, either on the first retaining body or on the attachment surface of the angle adjustment unit. In this manner, the same effect could be achieved by rotation of the screw unit. With the use of a sleeve and a screw unit contained therein, a particularly compact design of a linear adjustment unit can be achieved, which with the selection of a suitable thread implements relatively fine adjustment paths.

In an embodiment, the first retaining body comprises a threaded hole whose longitudinal axis is parallel to the longitudinal axis of the sleeve, furthermore a screwing device extends from the sleeve into the first retaining body and is designed to press the sleeve onto the first retaining body, or to release the sleeve therefrom thus rendering the sleeve rotatable to the retaining body. Attaching the sleeve to the first retaining body with the use of a screwing device is a mechanically very simple solution and could, for example, be implemented by affixing a countersunk hole in the sleeve and by the use of a countersunk screw with a corresponding countersunk head for screwing into the first retaining body. In order to undo the screw connection from the outside with the screw unit screwed into the sleeve, on the side of the first retaining body, which side faces away from the sleeve, the screwing device could comprise an operating unit, for example a key surface, an indentation comprising a profile, or some similar device for accommodating a screwing tool or an operating element.

In an embodiment, the angle adjustment unit comprises a bearing flange or an attachment flange and a retaining flange. The bearing flange is arranged on the retaining body of the second linear adjustment unit, and the bearing flange and the retaining flange comprise ratchet surfaces that face each other and that correspond to each other. The bearing flange is thus a body that can be rigidly connected to the second retaining body. This defines a fixed reference point for the retaining flange, which reference point can be arranged on the bearing flange. By means of ratchet surfaces that comprise a grid with a predetermined spacing pitch, practically any angles can be set that are necessary during a measuring campaign. Normally, components comprising ratchet surfaces are screwed together when the detent of one body is aligned so as to correspond to the detent of the other body. As a result of such screwing together, flanks of the detents mesh so that a firm positive-locking connection is established. Consequently, in the expected measuring campaigns it is always possible to maintain accurate positions to surfaces to be adjusted.

In an embodiment the retaining flange and the bearing flange do not comprise detents, but instead can be screwed together in any position. The screw connection can exert sufficient force between the retaining flange and the attachment flange so that a firm non-positive connection is created and the predetermined position is held in this manner. Consequently, it would be possible to implement any desired adjustment of the angle without a grid. However, in this arrangement it must always be ensured that the screw connection is firm enough.

In an embodiment, the angle adjustment unit comprises guide kinematics. Once the angle of the angle adjustment unit has been determined, the corresponding surface can be moved along this guide kinematics between the various setting positions, for example by way of a sliding block that can be slid in a slide. Consequently, minimal readjustment effort is necessary, and a measuring campaign with a multitude of different setting positions can be carried out in a comparatively short time, which in view of the normally very high operating costs of a wind tunnel results in relatively low costs in the implementation of measurements by means of the apparatus.

In an embodiment, the sliding block comprises a threaded hole into which a screwing device extends from the screw unit through the retaining flange and through the bearing flange. The screwing device is nonrotatably connected to the screw unit. This makes it possible, by means of rotation of the screw unit relative to the retaining flange and the bearing flange, to loosen the sliding block or for it to be used for clamping the guide kinematics, so that the angle adjustment unit can be adjusted. For segregated rotation of the screw body the aforesaid can, for example, comprise one or several key surfaces. During the screwing motion the sleeve situated underneath can be firm or loose, because it can easily be readjusted after the angle has been adjusted.

In an embodiment the guide kinematics comprises a slide guide along a section of a circular arc on a third axis that can be positioned by the first linear adjustment unit and/or the second linear adjustment unit. Preferably, this third axis extends to as to be essentially perpendicular to the first axis and to the second axis. Thus, by means of the apparatus, by means of the linear adjustment units, a hinge line formed by the third axis can be freely positioned in space in relation to the trailing edge of the wing of the aircraft model. Guiding along a circular arc can thus be implemented very flexibly. At the same time a compact design of the apparatus is possible.

In an embodiment, a compensation unit is provided in order to alter the spatial position of the first linear adjustment unit. The aforesaid is attached to the first linear adjustment unit and can be affixed to a structurally stable point of the aircraft model and is designed for this. If a spatially variable position of the first linear adjustment unit is applied, it is possible to take into account both different movement kinematics and different surfaces to be moved, and consequently the apparatus provides a degree of modularity.

In an embodiment, the compensation unit comprises a bar element of variable length, on which bar element the first linear adjustment unit is arranged. Depending on the angle between the bar element and the rigid structure of the aircraft model a spatial position of the first linear adjustment unit relative to the aircraft model can be set, which results, for example, from adapting the apparatus to a particular model, and thus obviates the need to manufacture an attachment flange that is necessary exclusively for this one special model.

In an embodiment, the bar element of variable length can be implemented by an elongated body that is connected to the first linear adjustment unit, preferably by way of a clamping connection. The elongated body could, for example, be designed in the form of a cylindrical pin, a shaft, a profile bar or the like.

In an embodiment the bar element is connectable to the aircraft model by way of a rotatable connection. This connection supports compensatory movement of the apparatus in the case of tension that could be caused by aerodynamic forces acting on the surface to be moved, so that the bar element can independently absorb tensile, compressive and flexural forces and moments, while not providing any resistance during rotation on the longitudinal axis of the bar element. This design further improves the modular characteristics of the apparatus, because a combination of the rotatability of the bar element with its variable length makes it possible to position the first linear adjustment unit in three spatial directions so that greater flexibility is provided during adaptation of the apparatus to the model used at the particular time.

In an embodiment the end of the bar element comprises an annular groove. The bar element can be inserted into an attachment flange and makes it possible to accommodate a pull-out protection device. This pull-out protection device could, for example, be implemented in the form of a securing pin or a securing screw that from the attachment flange is screwed into or inserted into the annular groove of the bar element and in this way allows rotation while preventing pulling out.

A surface unit is also provided that comprises a surface and an apparatus with the characteristics mentioned above. Furthermore, an aircraft model is provided that comprises at least one surface unit. Furthermore, a use of an aircraft model in a wind tunnel is provided for measuring and testing purposes.

BRIEF DESCRIPTION OF THE DRAWINGS

Further characteristics, advantages and application options of the present invention are disclosed in the following description of the exemplary embodiments and of the figures. The described and/or illustrated characteristics per se and in any combination form the subject of the embodiments, even irrespective of their composition in the individual claims or their interrelationships. Furthermore, identical or similar objects in the figures have the same reference characters, and:

FIG. 3 shows a wind tunnel with an aircraft model arranged therein.

DETAILED DESCRIPTION

Figure 1:
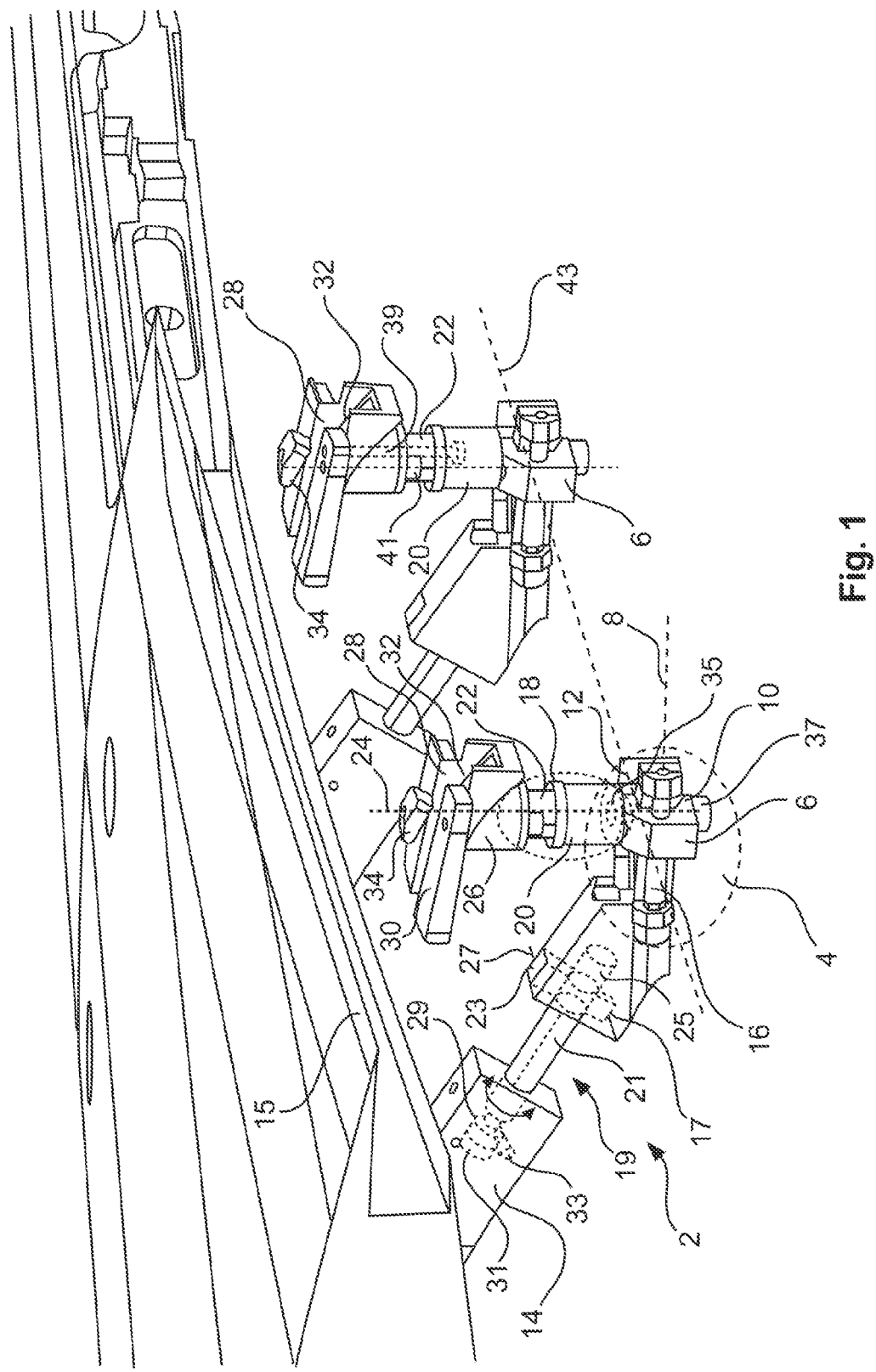
FIG. 1 shows a three-dimensional view of an apparatus according to an embodiment without a surface in place.
Figure 2:
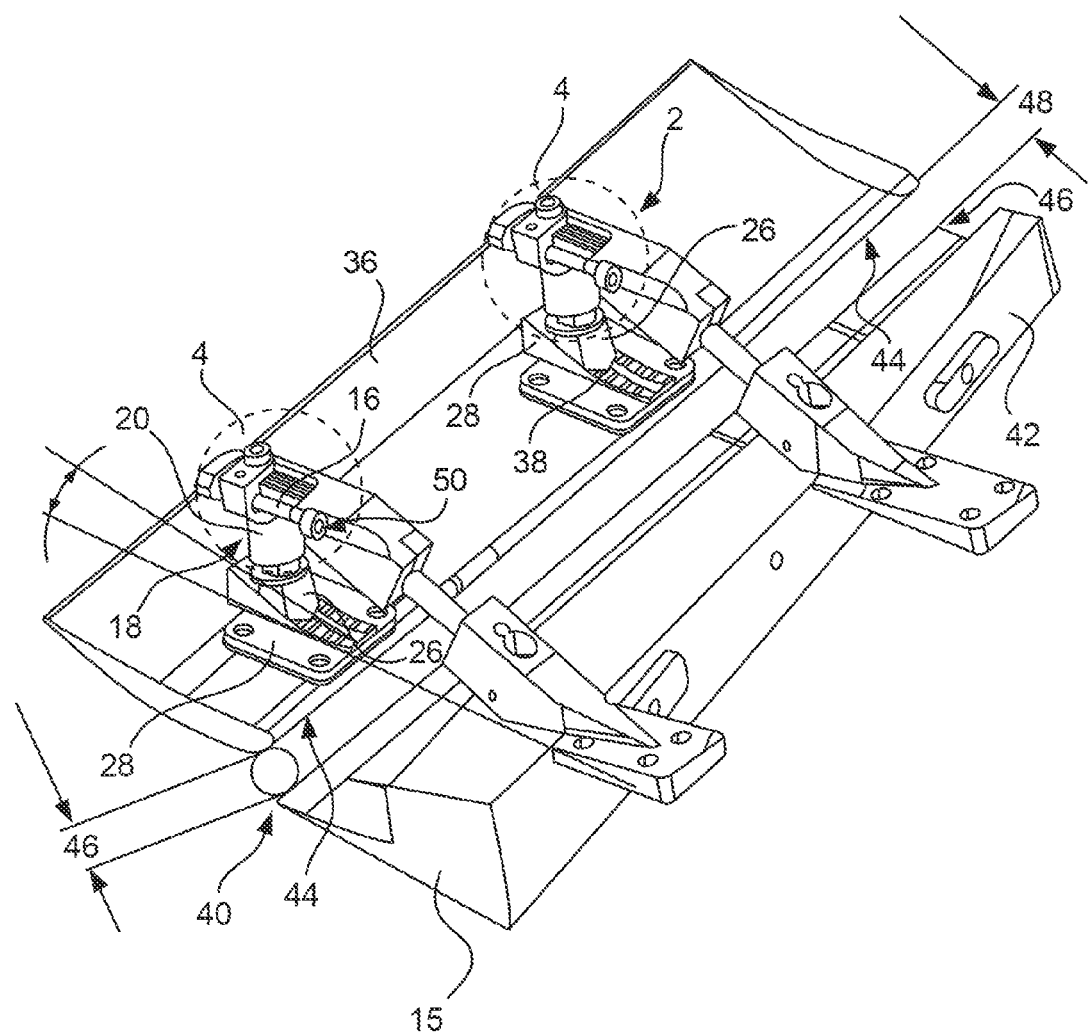
FIG. 2 shows a three-dimensional bottom view of the apparatus according to an embodiment with a surface in place.

FIG. 1 shows an apparatus for adjusting a surface of an aircraft model. For the sake of simplicity this surface is not shown in FIG. 1. FIG. 2 shows the apparatus with the surface installed. The apparatus 2 comprises a first linear adjustment unit 4 that has a first retaining body 6 that is held so as to be slidable on a first axis 8. To this effect the first retaining body 6 comprises a recess 10 that corresponds to an elongated projection 12 that forms a slide. This slide is connected to a retainer 17 arranged on the trailing edge 15 of the wing.

The compensation unit 19 comprises, for example, a bar element 21 that is designed as a cylinder pin that by way of a clamping connection with a clamping block 23 can be affixed to the retainer 17. To this effect the retainer 17 comprises a borehole 25 that on the side facing the trailing edge 15 of the wing is breached by the clamping block 23 that by way of a screwing device 27 can be attached to the retainer 17. The bar element 21 can be clamped to the retainer 17 at different plunging lengths.

At its end opposite the retainer 17 the bar element 21 comprises an annular groove 29 inserted in a wing holder 14 in a borehole 31, into which annular groove 29 a securing device 33, for example a grub screw, a securing screw or a securing pin, extends from the outside. Consequently the bar element cannot be pulled from the wing holder 14; however, it can freely rotate relative to the aforesaid on its longitudinal axis. This makes it possible to compensate for tension in the apparatus 2, which tension is caused by aerodynamic loads or other forces. At the same time, as a result of the freely rotatable design and the variable length of the bar element 21 good adaptability to model-specific parameters can be created.

By means of rotation of a spindle 16 that is rotatably held relative to the retainer 17 and that extends through a threaded hole 13, the first retaining body 6 can be slid along the first axis 8. In a particularly preferred manner the first retaining body 6 and the spindle 16 comprise corresponding threads that have a self-locking effect. This means that if a force acts on the first retaining body 6, no rotation of the spindle 16 takes place. Consequently, after completion of rotation of the spindle 16 the first retaining body 6 can remain in its position.

Arranged on the first retaining body is a second linear adjustment unit 18 that in the case shown comprises a rotatably held sleeve 20 with an internal thread, in which sleeve 20 and a screw unit 22 with a corresponding external thread is held. By rotation of the sleeve 20 the screw unit 22 is moved relative to a second axis 24. In this arrangement, fixation, e.g., by self-locking, needs to take place when the adjustment position has been reached.

Preferably, the sleeve 20 is attached to the first retaining body 6 by way of a countersunk screw 35, which retaining body 6 for this purpose comprises a threaded hole. The countersunk screw 35 preferably extends from the inside of the sleeve 20 through the first retaining body 6 and ends at the end of the first retaining body 6, which end is opposite the sleeve 20, where it can comprise an operating surface, a key surface or the like. As an example, the illustration shows a nut 37 screwed onto the countersunk screw 35, which nut 37 together with the countersunk screw 35 comprises a borehole in transverse direction, and comprises a securing pin, a securing wire or the like (not shown). When the nut 37 is rotated, the countersunk screw 35 can thus move in the first retaining body 6, and in this manner can support rotatability of the sleeve 20, or can prevent rotatability by pressing against the sleeve 20.

In the exemplary embodiment shown, the first axis 8 and the second axis 24 are aligned so as to be perpendicular to each other, thus forming a two-dimensional Cartesian coordinate system. In this manner a structural fixed point of a surface, limited by design, can be slid as desired on one plane.

The screw unit 22, which serves as the second retaining body, at its end facing away from the sleeve 20 comprises an attachment flange 26 that in turn is connected to a retaining flange 28. The angle between an attachment surface of the attachment flange 26 and a retaining surface 30 of the retaining flange 28 can be set so that the angle of a surface arranged on the retaining surface 30 can be varied, and thus the attachment flange 26 together with the retaining flange 28 forms an angle adjustment unit. In this arrangement the attachment surface is to be considered any surface by means of which the attachment flange 26 is arranged on the second linear adjustment unit 22.

In the exemplary embodiment shown, the retaining flange 28 additionally comprises guide kinematics 32, in the form of a recess as a motion link, and a sliding block 34 by means of which a surface as specified can be moved. Accordingly, by means of the apparatus 2, the spatial position of guide kinematics 32 can in a particularly advantageous manner be adjusted quickly and precisely, which obviates the need to provide a multitude of different individually manufactured attachment fittings. This slide guide can define a section of a circular arc on a third axis 43 positionable by the first linear adjustment unit 4 and/or the second linear adjustment unit 18. The third axis 43 is preferably arranged so as to be perpendicular on the first axis 8 and on the second axis 24. The third axis 43 thus forms a hinge line, which can be freely positioned in the space, for the surface 36 that can be attached on a resulting circular arc shape in variable positions without moving the linear adjustment units 4 and 18 or the third axis 43.

Preferably the sliding block 34 comprises a threaded hole that can accommodate a screwing device 39 that extends through the screw unit 22, the attachment flange 26 and the retaining flange 28. The screwing device 39 could, for example, be implemented by a cylinder head screw which by means of a screw lock lacquer, an adhesive or the like has been screwed into a thread of the screw unit 22 so as to be practically non-rotatable. In the illustration shown the screw head is then situated between the screw unit 22 and the rotatably held sleeve 20. The screw unit 22 comprises one or several key surfaces 41 by means of which the screw unit 22 can be rotated relative to the attachment flange 26, thus screwing the screwing device 39 into the sliding block 34 or from the sliding block 34 so that the retaining flange 28 can be undone, adjusted, and attached again.

Since the apparatus 2 provides only limited torsional strength it is necessary to use, for a surface, two of these apparatuses 2. For example, two apparatuses 2 could be used that can hold the opposite ends of a surface. FIG. 2 shows the same apparatus 2 but with a surface 36 arranged thereon. The bottom view further shows that the angle between the attachment flange 26 and the retaining flange 28 can be set by corresponding ratchet surfaces 38.

The apparatus 2 makes it possible to adjust the distance between the trailing edge 15 of a wing 42 and the leading edge 44 of the surface 36. In FIG. 2 this distance is denoted by reference character 46. In the investigation of trailing-edge flap systems, furthermore, an overlap 48 is a determining dimensioning factor that arises between the trailing edge 40 of the wing 42 and the leading edge 44 of the surface 36.

Adjustment of the first linear adjustment unit 4 takes place by means of rotation of the spindle 16 on an operation end 50 that could, for example, comprise a recess for accommodating a socket or the like. At the same time the second linear adjustment unit 18 can be adjusted by rotation of the sleeve 20. The angle between the attachment flange 26 and the retaining flange 28 can be achieved by the above-mentioned screw connection. FIG. 3 finally shows a wind tunnel 52 comprising a tunnel floor 54 and a tunnel ceiling 56 on which an aircraft model 58 is arranged so as to be subjected to airflow.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An apparatus for adjusting a surface of an aircraft model, comprising:
    a wing holder coupled to a trailing edge of a wing of the aircraft model;
    a first linear adjustment unit coupled to the wing holder and having a first retaining body that is movable along a first axis;
    a second linear adjustment unit arranged on the first retaining body and having a second retaining body that is movable along a second axis, the second axis transverse to the first axis; and
    an angle adjustment unit arranged on the second retaining body that is designed to adjust and lock an angle between an attachment surface and a retaining surface,
    wherein the first linear adjustment unit is directly connected to the second linear adjustment unit, and the second linear adjustment unit is directly connected to the angle adjustment unit.

2. The apparatus of claim 1, wherein the first axis extends essentially perpendicular to the second axis.

3. The apparatus of claim 1, wherein the first linear adjustment unit comprises an adjustment thread.

4. The apparatus of claim 1, wherein the second linear adjustment unit comprises an adjustment thread.

5. The apparatus of claim 1,
    wherein the first linear adjustment unit is a slide guide that is configured to hold the first retaining body along the first axis in a linear manner, and wherein the first retaining body comprises a threaded hole through which a rotatably held spindle extends.

6. The Apparatus of claim 1, wherein the second linear adjustment unit comprises a sleeve with an internal thread arranged therein, as well as a screw unit with a corresponding external thread, and wherein the sleeve is rotatably held.

7. The Apparatus of claim 1, wherein the second linear adjustment unit comprises a sleeve with an internal thread arranged therein, as well as a screw unit with a corresponding external thread, and wherein the screw unit is rotatably held.

8. The apparatus of claim 1, wherein the angle adjustment unit comprises an attachment flange and a retaining flange, wherein the attachment flange is arranged on the retaining body of the second linear adjustment unit, and wherein the attachment flange and the retaining flange comprise ratchet surfaces that face each other and that correspond to each other and that are configured to establish a positive-locking connection.

9. The apparatus of claim 8, wherein the retaining flange and the attachment flange do not comprise a detent and are configured to establish a non-positive connection.

10. The apparatus of claim 1, wherein the angle adjustment unit comprises guide kinematics.

11. The apparatus of claim 10, wherein the guide kinematics comprises a slide guide along a section of a circular arc on a third axis that is positionable by the first linear adjustment unit.

12. The apparatus of claim 11, wherein the guide kinematics comprises a slide guide along a section of a circular arc on a third axis that is positionable by the second linear adjustment unit.

13. The apparatus of claim 11, wherein the third axis extends essentially perpendicular to the first axis and essentially perpendicular to the second axis.

14. The apparatus of claim 1, further comprising a compensation unit that is configured to adjust a spatial position of the first linear adjustment unit with a bar element of variable length, wherein the bar element is rotatably held on a spatially fixed structure on which the bar element is arranged on the first linear adjustment unit.

15. A surface unit, comprising:
a surface; and
an apparatus that is configured to adjust the surface of an aircraft model, the apparatus comprising:
  a wing holder coupled to a trailing edge of a wing of the aircraft model;
  a first linear adjustment unit coupled to the wing holder and having a first retaining body that is movable along a first axis;
  a second linear adjustment unit arranged on the first retaining body and having a second retaining body that is movable along a second axis, the second axis transverse to the first axis; and
  an angle adjustment unit arranged on the second retaining body that is designed to adjust and lock an angle between an attachment surface and a retaining surface,
  wherein the first linear adjustment unit is directly connected to the second linear adjustment unit, and the second linear adjustment unit is directly connected to the angle adjustment unit.

16. The surface unit of claim 15, wherein the first axis extends essentially perpendicular to the second axis.

17. The surface unit of claim 15, wherein the first linear adjustment unit comprises an adjustment thread.

18. An aircraft model, comprising:
a surface unit, comprising:
a surface; and
an apparatus that is configured to adjust the surface of an aircraft model, the apparatus comprising:
  a wing holder coupled to a trailing edge of a wing of the aircraft model;
  a first linear adjustment unit coupled to the wing holder and having a first retaining body that is movable along a first axis;
  a second linear adjustment unit arranged on the first retaining body and having a second retaining body that is movable along a second axis, the second axis transverse to the first axis; and
  an angle adjustment unit arranged on the second retaining body that is designed to adjust and lock an angle between an attachment surface and a retaining surface,
  wherein the first linear adjustment unit is directly connected to the second linear adjustment unit, and the second linear adjustment unit is directly connected to the angle adjustment unit.

19. The aircraft model of claim 18, wherein the first linear adjustment unit is a slide guide that is configured to hold the first retaining body along the first axis in a linear manner, and wherein the first retaining body comprises a threaded hole through which a rotatably held spindle extends.

20. The aircraft model of claim 18, wherein the angle adjustment unit comprises an attachment flange and a retaining flange, wherein the attachment flange is arranged on the retaining body of the second linear adjustment unit, and wherein the attachment flange and the retaining flange comprise ratchet surfaces that face each other and that correspond to each other and that are configured to establish a positive-locking connection.

* * * * *